United States Patent [19]

Seitz

[11] 4,321,093

[45] Mar. 23, 1982

[54] MOISTURE-SET COLOR DEVELOPER INK

[75] Inventor: Michael E. A. Seitz, Dayton, Ohio

[73] Assignee: The Standard Register Company, Dayton, Ohio

[21] Appl. No.: 137,505

[22] Filed: Apr. 4, 1980

[51] Int. Cl.³ .................. C09D 11/04; C09D 11/08; C09D 11/14

[52] U.S. Cl. ...................... 106/21; 106/22; 106/23; 106/24; 106/26; 106/28; 106/30; 106/31; 282/27.5

[58] Field of Search ............. 106/21, 23, 24, 25, 106/30, 22, 26, 28, 31; 282/27.5

[56] References Cited

U.S. PATENT DOCUMENTS

| | | | |
|---|---|---|---|
| 2,244,103 | 6/1941 | Erickson et al. | 106/30 |
| 2,285,183 | 6/1942 | Bernardi | 101/416 |
| 2,300,881 | 11/1942 | Erickson et al. | 260/29 |
| 2,313,328 | 3/1943 | Erickson et al. | 260/22 CQ |
| 2,346,969 | 4/1944 | Jeuck et al. | 106/30 |
| 3,011,905 | 12/1961 | Newman | 282/27.5 |
| 3,446,647 | 5/1969 | Rizner | 106/24 |
| 3,663,256 | 5/1972 | Miller et al. | 282/27.5 |
| 3,900,669 | 8/1975 | Kiritani | 428/307 |
| 3,934,070 | 1/1976 | Kimura et al. | 428/342 |
| 4,139,392 | 2/1979 | Davis et al. | 106/31 |
| 4,200,667 | 4/1980 | Lee et al. | 427/44 |
| 4,230,495 | 10/1980 | Lee et al. | 106/22 |

OTHER PUBLICATIONS

Wolfe, H. J., *Printing and Litho Inks*, MacNair–Dorland Co., 1967, pp. 353–355.

*Primary Examiner*—John Kight, III
*Assistant Examiner*—Nathan M. Nutter
*Attorney, Agent, or Firm*—Jacox & Meckstroth

[57] ABSTRACT

A color developer ink for use in the production of the CF coating of a carbonless copy paper set is formulated as a moisture-set ink which dries by precipitation into an immobile solid film. The formulation includes 10–40% of the color developer, preferably a zinc salt of an organic acid, 30–60% of a hygroscopic solvent, 0–5% of a water-insoluble binder, and 0–35% of a filler.

20 Claims, No Drawings

MOISTURE-SET COLOR DEVELOPER INK

FIELD OF THE INVENTION

The present invention relates to a novel approach to the production of a high quality color developer coating that can be applied like an ink to the appropriate sheet of a carbonless copy paper set.

BACKGROUND OF THE INVENTION

In the manufacture of pressure-sensitive recording papers, better known as carbonless copy papers, a layer of pressure-rupturable microcapsules containing a solution of colorless dyestuff precursor is normally coated on the back side of the front sheet of paper of a carbonless copy paper set. This coated back side is known as the CB coating. In order to develop an image or copy, the CB coating must be mated with a paper containing a coating of suitable color developer, also known as dyestuff acceptor, on its front. This coated front color developer coating is called the CF coating. The color developer is a material, usually acidic, capable of forming the color of the dyestuff by reaction with the dyestuff precursor. Marking of the pressure-sensitive recording papers is effected by rupturing the capsules in the CB coating by means of pressure to cause the dyestuff precursor solution to be exuded onto the front of the mated sheet below it. The colorless or slightly colored dyestuff, or dyestuff precursor, then reacts with the color developer in the areas at which pressure was applied, thereby effecting the colored marking. Such mechanism or the producing technique of pressure sensitive recording papers is well known.

Heretofore, most CF coatings were applied as an aqueous system. The color developer may typically be dispersions of clay, phenolic resin, or zinc salts of an organic acid in water with a small amount of binder. They are typically coated by any one of a number of well known aqueous coating methods onto the paper substrate. Moisture is removed by passing the substrate through ovens. The finished coating is rough and usually requires calendering. There are numerous disadvantages to this procedure.

1. The aqueous coating equipment required is very expensive.
2. Large amounts of energy are expended to dry the coating.
3. This method is an off-line (full coat) operation with regard to the manufacture of multicopy form sets, and is more expensive than on-line (partial coating) printing operations.

The limitations and costs inherent in aqueous CF coatings led to the development of CF inks incorporating phenolic resins. These inks are essentially high-boiling-point aliphatic solvents containing a large amount of a phenolic resin dissolved therein. Although they are appliable by means of printing press and require none of the expensive equipment associated with aqueous coatings, they suffer from the following inferior physical properties.

1. The ink has a distinct and strong odor characteristic of phenolic resins and aliphatic solvents.
2. The nature of concentrated phenolic resin solutions makes these inks highly tacky.
3. The inks possess poor image stability.
4. The resulting ink film is fugitive; it migrates through the paper substrate producing poor aging characteristics.

The latter point represents the most serious drawback of these inks using organic solvent. Ideally one would prefer that the solvent drain off leaving the phenolic resin as an immobile film. However, when phenolic resins in compatible solvents are used, there is no physical reason for such a separation of resin and solvent. In practice, the migrating solvent carries phenolic color developer into the sheet and offsets onto adjacent sheets. This movement causes excessive discoloration of CF-CB sets and limits their shelf life. There is no true conversion from a mobile ink to a solid immobile film.

Coatings dried by evaporation, e.g., those applied by the flexographic or gravure processes, or by ultraviolet cure have been formulated to immobilize the CF film. The solvent coatings, however, require expensive solvent recovery equipment or consume large quantities of expensive solvents with related solvent vapor emission problems. The expense of such an operation is prohibitive. The formulation of the UV curable inks requires extensive press modification, costly ingredients, and a high percentage of non-active materials which reduces the resulting films' usefulness. These two types of ink do not represent economically viable solutions.

No means has previously been available for the on-line printing operation of a CF ink to obtain an immobile solid film without sacrifice of imaging potential.

SUMMARY OF THE INVENTION

Accordingly, it is an object of the present invention to eliminate the deficiencies of the prior art, such as those set forth hereinabove.

It is a further object of the present invention to provide an improvement in inks used for printing CF coatings in carbonless copy paper sets.

It is a further object of the present invention to provide a process for printing the CF coating in a carbonless copy paper set, suitable for a conventional business forms press.

It is yet another object of the present invention to provide an ink for use in printing the CF coatings of a carbonless copy paper set which converts from a mobile state to an immobile solid film without sacrifice of imaging potential.

It is still another object of the present invention to provide such an ink which dries by precipitation.

It is still another object of the present invention to provide such an ink which is set by moisture.

Still other objects, features and attendant advantages of the present invention will become apparent to those skilled in the art from a reading of the following detailed description of embodiments in accordance therewith.

DESCRIPTION OF PREFERRED EMBODIMENTS

The above described problems of the prior art are avoided in accordance with the present invention by providing the color developer in an ink which is set by moisture, which, in conformity with the standard ink technology, is called a moisture-set CF ink.

Moisture-set CF inks dry by precipitation. They contain a water-insoluble color developer, which is usually an acidic material, and optionally a binder dissolved in a hygroscopic solvent. The ink can be applied by any of the common printing processes other than lithographic.

Once on paper, the solvent absorbs moisture from the air. Since the color developer and the binder are insoluble in water and water/solvent mixtures, the ink soon absorbs enough moisture such that the solvent plus water becomes a non-solvent for these components. At this point, the color developer and binder precipitate out of the solvent and onto the sheet. A true phase separation occurs in the ink. The color developer and binder form the solid phase, and the solvent plus absorbed water forms a liquid phase. The mobile liquid phase no longer contains any color developer and therefore causes no discoloration or other damage in contact with the CB coating. Because of this phase transition, the active CF ingredients are completely deposited on the surface of the sheet in the solid state. No migration or other loss can occur. This immobility imparts superior aging characteristics to the CF coating produced in accordance with the present invention.

Moisture-set inks, in general, have been known in the printing field, as evidenced, for example, by U.S. Pat. Nos. 2,244,103, 2,300,881, 2,313,328, 2,346,969 and 2,285,183. However, the actual formation of the moisture-set CF ink in accordance with the present invention represents a departure from what is commonly understood as a moisture-set ink. Those experienced with the use of moisture-set inks in the printing field known that such moisture-set inks are essentially 50-50 mixtures of resin (binder) and glycol (hygroscopic solvent), with small amounts of pigments or dyes added. Only a few percentages of filler, clay, and the like are employed to avoid excessive glycol retention by the resin which produces a highly tacky ink film on the paper. Furthermore, as thin a film as possible is laid down so as to achieve a fast drying rate.

In contrast to such conventional moisture-set inks, in formulating a CF ink, the primary objective is a coating with maximum chemical reactivity. This different purpose necessitates a radically different formulation. In fact, the CF formulation is nearly the inverse of conventional moisture-set inks. Intead of a high binder-low filler formulation, the moisture-set CF ink in accordance with the present invention is formulated to have the highest filler and lowest binder content that can be achieved without sacrifice of printability. The clay or other filler incorporated into the ink (1) thickens the ink, and, more importantly, (2) increases the surface area available for nucleation and adsorption of the acidic, color developer precipitate. The filler may also function as a color developer in its own right.

The drying rate of the moisture-set CF ink of the present invention is readily controlled through formulation or by external application of moisture. To achieve the maximum in drying speed, the solvent should be as hygroscopic as possible and still dissolve the binder and, preferably, also the color developer. Also, the binder and developer should not be too soluble in the solvent. In this way, only a small amount of water need be picked up by the ink to initiate the phase separation. However, care must be exercised in that the ink could dry too fast. The ink must remain fluid long enough to avoid any premature "setting" on the press rolls. In addition to formulation, a high humidity box, moisture spray, or steam curtain may be employed after the printing station to immediately set the ink. The external addition of moisture accelerates the phase separation, and can be used to eliminate offset that might occur in some formulations at high press speeds.

The typical composition is as follows:

|  | Range % | Preferred or Optimum % |
| --- | --- | --- |
| Solvents | 30–60 | 35–50 |
| Organic zinc salts and/or Phenolic resin | 10–40 | 20–33 |
| Binder | 0–5 | 0–2 |
| Clay or other filler | 0–35 | 20–30 |

As solvent for use in the present invention, any compound or mixture of compounds may be used which has sufficient hygroscopicity or water solubility properties to cause precipitation of the color developer and binder upon absorption of water, and still serves as a solvent for the binder, if used, and preferably also for the color developer used. Glycols are preferred as they possess the necessary hygroscopicity required by these vehicles, and they are fairly stable on the rollers and in the fountains of printing presses at room temperatures, i.e., they have low vapor pressures. Moreover, they are good solvents for the organic color developers and binders used in these inks, but become non-solvent upon absorption of water. Suitable glycols include ethylene glycol, diethylene glycol, triethylene glycol, tetraethylene glycol, propylene glycol, dipropylene glycol, tripropylene glycol, butylene glycol, hexylene glycol, and the glycol ethers, such as diethylene glycol monomethyl ether and ethylene glycol monomethyl ether. Monoacetin and diacetin may also be used. Diethylene glycol is the most useful solvent for moisture-set CF inks in accordance with the present invention. Small percentages of the higher glycols, such as nonaethylene glycol or polyethylene glycol, may be incorporated to impart improved workability or press stability to the so-called "lower glycols".

Most known fillers may be used as filler in accordance with the present invention. In particular, kaolinites, montmorillonites, attapulgite, bentonite, hydrated alumina, fumed silicon dioxide, and zinc oxide, with particle sizes less than or equal to 1 micrometer, are suitable.

The binder composition for use with the present invention is not critical and may include those binders normally used in moisture-setting compositions. In particular, zein, hydroxypropylcellulose, or shellac are useful binders. Adducts, or reaction products, of maleic or fumaric acid with rosin, or some other terpene, i.e., maleic or fumaric resins of relatively high acid numbers, may also be used as binder.

The acidic CF color developers which convert dye precursors to the colored state which may be used in the present invention are well known to those familiar with chemical copy products. Such known color developers include natural clay ores such as acid clay, bentonite, kaolinite, and montmorillonite, inorganic materials such as finely divided silicic anhydride, magnesium silicate and aluminum oxide, and organic materials such as phenolic compounds, especially polyphenols, maleic resins and formaldehyde resins, as well as organic acids, and particularly polyvalent metal salts thereof. Although any of these materials can be use wholly or in part, the organic materials, such as phenolic resins and organic acids, are prefeerred, with zinc salts of organic acids being most preferred. The phenolic resins include phenol-formaldehyde novolac resins, preferably those derived from the condensation of a para-substituted phenol with formaldehyde. Metal salts thereof may also pressure to provide substantial stability on the rollers and in the fountain of a printing press at room temperature; and 0–35% of clay or other filler, all percentages are by weight of the total composition.

2. A moisture-set color developer ink formulation in accordance with claim 1, wherein said color developer is soluble in said solvent, but non-soluble therein after absorption of water by said solvent.

3. A moisture-set color developer ink formulation in accordance with claim 2, comprising:
20–33% of said color developer,
35–50% of said solvent, after solvent,
0–2% of said binder, and
20–30% of said filler.

4. A moisture-set color developer ink formulation, capable of being applied by a printing press with rollers and a fountain, consisting essentially of:
10–40% of a water-insoluble carbonless copy color developer or compounds which form said amount of color developer in situ;
0–5% of a water soluble binder;
30–60% of a combination of
(a) a hygroscopic solvent for the binder used, if any, and having sufficient hygroscopicity or water solubility properties to cause precipitation of the color developer and binder, if any, upon absorption of water, said solvent having sufficiently low vapor pressure to provide substantial stability on the rollers and in the fountain of a printing press at room temperature, and
(b) an aliphatic oil or wax, which is immiscible with water but which is miscible with said solvent, for reducing the hygroscopic, polar nature of said solvent,
the ratio of said solvent to said oil or wax being 1:1 to 5:1; and
0–35% of clay or other filler, all percentages are by weight of the total composition.

5. A moisture-set color developer ink formulation in accordance with claim 4, wherein said color developer is soluble in said solvent, but non-soluble therein after absorption of water by said solvent.

6. A moisture-set color developer ink formulation in accordance with claim 5, comprising:
20–33% of said color developer,
35–50% of said combination of said solvent and oil or wax,
0–2% of said binder, and
20–30% of said filler.

7. A moisture-set color developer ink formulation in accordance with claim 2, or 5 wherein said color developer comprises a phenolic resin color developer or an organic acid color developer or a polyvalent metal salt thereof.

8. A moisture-set color developer ink formulation in accordance with claim 2, or 5 wherein said color developer comprises a polyvalent metal salt of substituted or unsubstituted salicylic or benzoic acid.

9. A moisture-set color developer ink formulation in accordance with claim 8, wherein said color developer is a zinc salt of salicylic acid, (m or p)-hydroxy-benzoic acid, 3,5-ditert-butyl-salicylic acid, or octyl salicylic acid.

10. A moisture-set color developer ink formulation in accordance with claim 8, wherein said color developer comprises a combination of polyvalent metal oxide or carbonate and said acid to form said salt in situ.

11. A moisture-set color developer ink formulation in accordance with claim 1 or claim 4, wherein said filler is selected from the group consisting of kaolinites, montmorillonites, attapulgite, bentonite, hydrated alumina, fumed silicon dioxide, and zinc oxide, with particle sizes no greater than about 1 micrometer.

12. A moisture-set color developer ink formulation in accordance with claim 2 or claim 5, wherein said solvent is selected from the group consisting of ethylene glycol, diethylene glycol, triethylene glycol, tetraethylene glycol, propylene glycol, butylene glycol, hexylene glycol, dipropylene glycol, tripropylene glycol, diethylene glycol monomethyl ether, ethylene glycol monomethyl ether, monoacetin or diacetin.

13. A moisture-set color developer ink formulation in accordance with claim 4 comprising:
10–40% of said color developer,
19–33% of said solvent,
11–30% of said oil or wax,
0–5% of said binder, and
0–35% of said filler.

14. A moisture-set color developer ink formulation in accordance with claim 13, wherein said oil or wax is an unsaturated fatty acid.

15. In a carbonless copy paper set having a CB coating of a dyestuff precursor and a CF coating of a color developer, the improvement wherein said CF coating is obtained by printing with the ink formulation in accordance with one of claims 1, 2 or 4.

16. A moisture-set color developer ink formulation in accordance with claim 1 or claim 4, wherein said binder is zein, hydroxypropylcellulose, shellac or a maleic or fumaric resin of relatively high acid number.

17. A moisture-set color developer ink formulation in accordance with claim 12, wherein said filler is selected from the group consisting of kaolinites, montmorillonites, attapulgite, bentonite, hydrated alumina, fumed silicon dioxide, and zinc oxide, with particle sizes no greater than about 1 micrometer.

18. A moisture-set color developer ink formulation in accordance with claim 11, wherein said binder is zein, hydroxypropylcellulose, shellac or a maleic or fumaric resin of relatively high acid number.

19. A moisture-set color developer ink formulation in accordance with claim 12, wherein said color developer comprises a phenol resin color developer or an organic acid color developer or a polyvalent metal salt thereof.

20. A moisture-set color developer ink formulation in accordance with claim 19, wherein said filler is selected from the group consisting of kaolinites, montmorillonites, attapulgite, bentonite, hydrated alumina, fumed silicon dioxide, and zinc oxide, with particle sizes no greater than about 1 micrometer.

* * * * *

UNITED STATES PATENT AND TRADEMARK OFFICE
CERTIFICATE OF CORRECTION

PATENT NO. : 4,321,093
DATED : March 23, 1982
INVENTOR(S) : Michael E. A. Seitz

It is certified that error appears in the above-identified patent and that said Letters Patent are hereby corrected as shown below:

Column 3, line 27, change "known" to ---know---.
Column 3, line 40, change "Intead" to ---Instead---.
Column 4, line 62, change "use" to ---used---.
Column 5, line 20, change "in" to ---is---.
Column 7, line 13, delete "after solvent,".

Signed and Sealed this

Eighteenth Day of May 1982

[SEAL]

Attest:

GERALD J. MOSSINGHOFF

Attesting Officer      Commissioner of Patents and Trademarks